United States Patent
Kurakata

(10) Patent No.: US 11,228,685 B2
(45) Date of Patent: Jan. 18, 2022

(54) IMAGE PROCESSING CIRCUIT BOARD, READING DEVICE, IMAGE FORMING APPARATUS, IMAGE PROCESSING METHOD AND IMAGE PROCESSING DEVICE REPLACING INVALID AREA OUTPUT FROM IMAGE SENSOR AFTER BLACK CORRECTION

(71) Applicant: Takahiro Kurakata, Kanagawa (JP)

(72) Inventor: Takahiro Kurakata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/128,213

(22) Filed: Dec. 21, 2020

(65) Prior Publication Data

US 2021/0234970 A1    Jul. 29, 2021

(30) Foreign Application Priority Data

Jan. 23, 2020   (JP) .............................. JP2020-009413

(51) Int. Cl.
*H04N 1/00* (2006.01)
*H04N 1/407* (2006.01)

(52) U.S. Cl.
CPC ..... *H04N 1/00087* (2013.01); *H04N 1/00013* (2013.01); *H04N 1/00037* (2013.01); *H04N 1/00063* (2013.01); *H04N 1/4076* (2013.01)

(58) Field of Classification Search
CPC ........... H04N 1/00013; H04N 1/00037; H04N 1/00063; H04N 1/00087; H04N 1/4076
See application file for complete search history.

(56) References Cited

U.S. PATENT DOCUMENTS

| 5,168,373 | A | * | 12/1992 | Nakamura | ......... H04N 1/00002 |
| | | | | | 358/406 |
| 10,674,035 | B2 | * | 6/2020 | Mizude | ................ H04N 1/3873 |
| 2009/0219558 | A1 | * | 9/2009 | Murakami | ............. H04N 1/387 |
| | | | | | 358/1.13 |
| 2012/0162729 | A1 | | 6/2012 | Kurakata | |
| 2013/0170000 | A1 | | 7/2013 | Kurakata et al. | |

FOREIGN PATENT DOCUMENTS

| JP | 9-091398 | | 4/1997 | |
| JP | 2002-218179 | | 8/2002 | |
| JP | 2003060878 | A * | 2/2003 | ............... H04N 1/38 |
| JP | 2004-015120 | | 1/2004 | |

* cited by examiner

*Primary Examiner* — Scott A Rogers

(74) *Attorney, Agent, or Firm* — Xsensus LLP

(57) ABSTRACT

An image processing circuit board, a reading device, an image forming apparatus, an image processing method, and an image processing device. The image processing circuit board subtracts output of an image sensor when no input light is received, from output of a reading device that reads image data of a subject using the image sensor, discriminates between effective area and invalid area of the image data output by the reading device, and converts the image data of the invalid area into a predetermined output value after the output of the image sensor when no input light is received is subtracted from the output of the reading device.

8 Claims, 9 Drawing Sheets

IMAGE PROCESSING CIRCUIT BOARD, READING DEVICE, IMAGE FORMING APPARATUS, IMAGE PROCESSING METHOD AND IMAGE PROCESSING DEVICE REPLACING INVALID AREA OUTPUT FROM IMAGE SENSOR AFTER BLACK CORRECTION

CROSS-REFERENCE TO RELATED APPLICATION

This patent application is based on and claims priority pursuant to 35 U.S.C. § 119(a) to Japanese Patent Application No. 2020-009413, filed on Jan. 23, 2020, in the Japan Patent Office, the entire disclosure of which is hereby incorporated by reference herein.

BACKGROUND

Technical Field

The present disclosure relates to an image processing circuit board, a reading device, an image forming apparatus, an image processing method, and an image processing device.

Background Art

Conventionally, in an image reading device such as a scanner, a variation in the alignment (registration) of a document setting position occurs for each device due to accumulation of deviation in component assembly position.

A technique for adjusting registration in the sub-scanning direction and the main scanning direction after assembling the image reading device is disclosed so that a regular image scanning process in which a document is positioned at a set position is performed.

SUMMARY

Embodiments of the present disclosure describes an image processing circuit board, a reading device, an image forming apparatus, an image processing method, and an image processing device. The image processing circuit board subtracts output of an image sensor when no input light is received, from output of a reading device that reads image data of a subject using the image sensor, discriminates between effective area and invalid area of the image data output by the reading device, and converts the image data of the invalid area into a predetermined output value after the output of the image sensor when no input light is received is subtracted from the output of the reading device.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
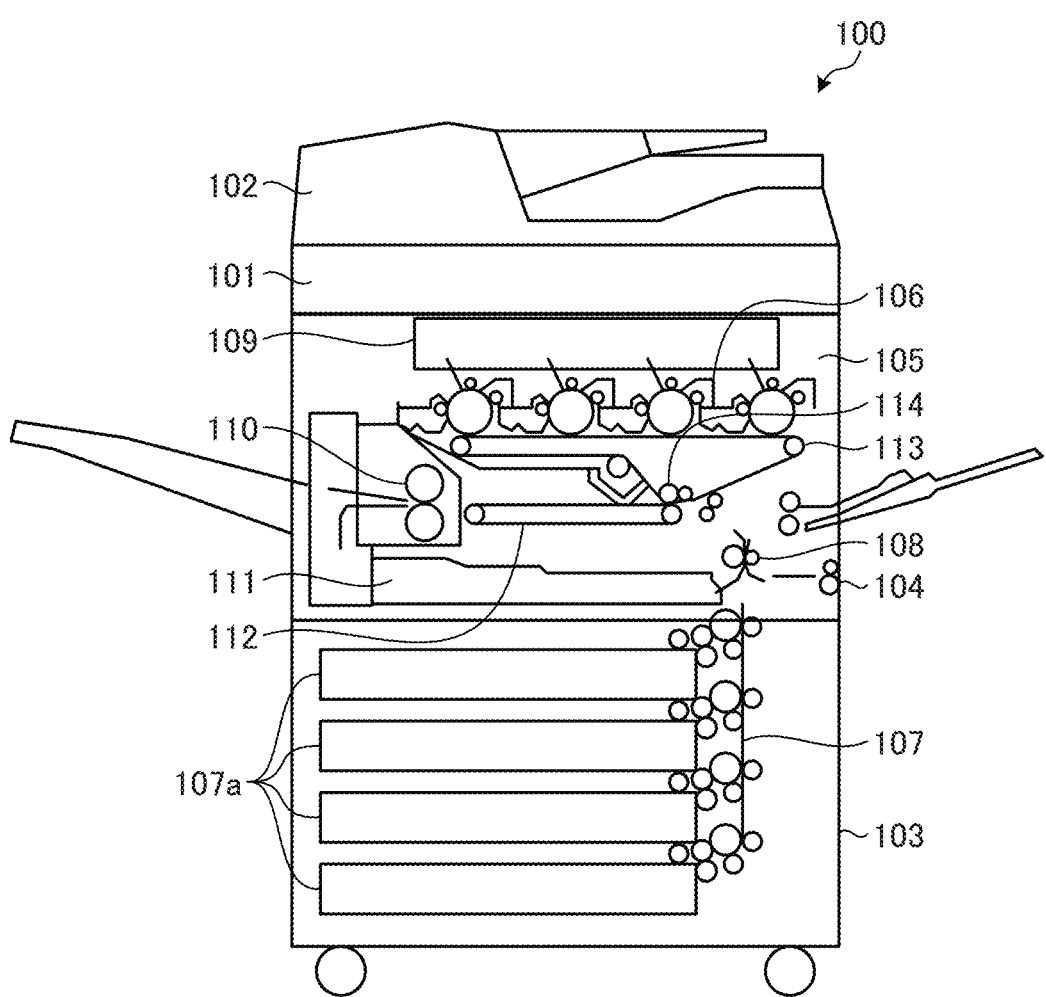
FIG. 1 is a diagram illustrating a configuration of an example of an image forming apparatus according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Hereinafter, embodiments of an image processing circuit board, a reading 5 device, an image forming apparatus, and an image processing method is described in detail with reference to the accompanying drawings.

FIG. 1 is a diagram illustrating a configuration of an example of an image forming apparatus 100 according to a first embodiment. The image forming apparatus 100 illustrated in FIG. 1 is an image forming apparatus generally referred to as a multifunction peripheral (MFP), which has at least two functions of a copy function, a printer function, a scanner function, and a facsimile function.

The image forming apparatus 100 includes an image reading unit 101 which is an example of a reading device, an automatic document feeder (ADF) 0.102, and an image forming unit 103 which is an example of an image forming device, below the image reading unit 101. For the image forming unit 103 in the figure, outer covers are removed to present the internal configuration.

The ADF 102 is a document support unit that positions a document, which is a subject for reading an image, at a reading position. The ADF 102 automatically conveys the document placed on the mounting table to the reading position. The image reading unit 101 reads the document conveyed by the ADF 102 at the reading position. Further, the image reading unit 101 includes a contact glass on an upper surface, which is a document supporting portion on which the document is placed and reads the document on the contact glass at the reading position. Specifically, the image reading unit 101 is a scanner including a light source, an optical system, and an image sensor such as a complementary metal oxide semiconductor (CMOS) inside and reads reflected light of the document illuminated by the light source with the image sensor through the optical system.

The image forming unit 103 prints an original image read by the image reading unit 101. The image forming unit 103 includes a manual roller 104 for manually feeding the recording paper and a recording paper supply unit 107 for supplying the recording paper. The recording paper supply unit 107 includes a mechanism for feeding out the recording paper from multi-stage recording paper feed cassettes 107a. The supplied recording paper is sent to the secondary transfer belt 112 via the registration roller 108.

A toner image formed on an intermediate transfer belt 113 is transferred to the recording paper carried by the secondary transfer belt 112 at a transfer unit 114.

Further, the image forming unit 103 includes an optical writing device 109, a tandem type image forming unit (Y, M, C, K) 105, the intermediate transfer belt 113, the secondary transfer belt 112, and the like. An image written by the optical writing device 109 is formed as a toner image on the intermediate transfer belt 113 through the image forming process by the image forming unit 105.

Specifically, the image forming unit (Y, M, C, K) 105 includes four rotatable photoconductor drums (Y, M, C, K) and an image forming element 106 including a charging roller, a developing device, a primary transfer roller, a cleaner unit, and a static eliminator formed around each photoconductor drum respectively. With functions of the image forming element 106 in each photoconductor drum, the image on the photoconductor drum is transferred onto the intermediate transfer belt 113 by each primary transfer roller.

The intermediate transfer belt 113 faces a nip formed between each photoconductor drum and each primary transfer roller by being stretched by a driving roller and a driven roller. The toner image primarily transferred to the intermediate transfer belt 113 is secondarily transferred to the recording paper on the secondary transfer belt 112 by a secondary transfer device, as the intermediate transfer belt 113 rotates. The recording paper is conveyed to a fixing device 110 with rotation of the secondary transfer belt 112, and the toner image is fixed as a color image on the recording paper. After that, the recording paper is discharged to an output tray outside the MFP. In case of double-sided printing, front and back sides of the recording paper are reversed by a reversing mechanism 111, and the inverted recording paper is sent onto the secondary transfer belt 112.

The image forming unit 103 is not limited to a unit that forms an image by an electrophotographic method as described above and may be a unit that forms an image by an inkjet method.

Next, the image reading unit 101 is described.

Figure 2:
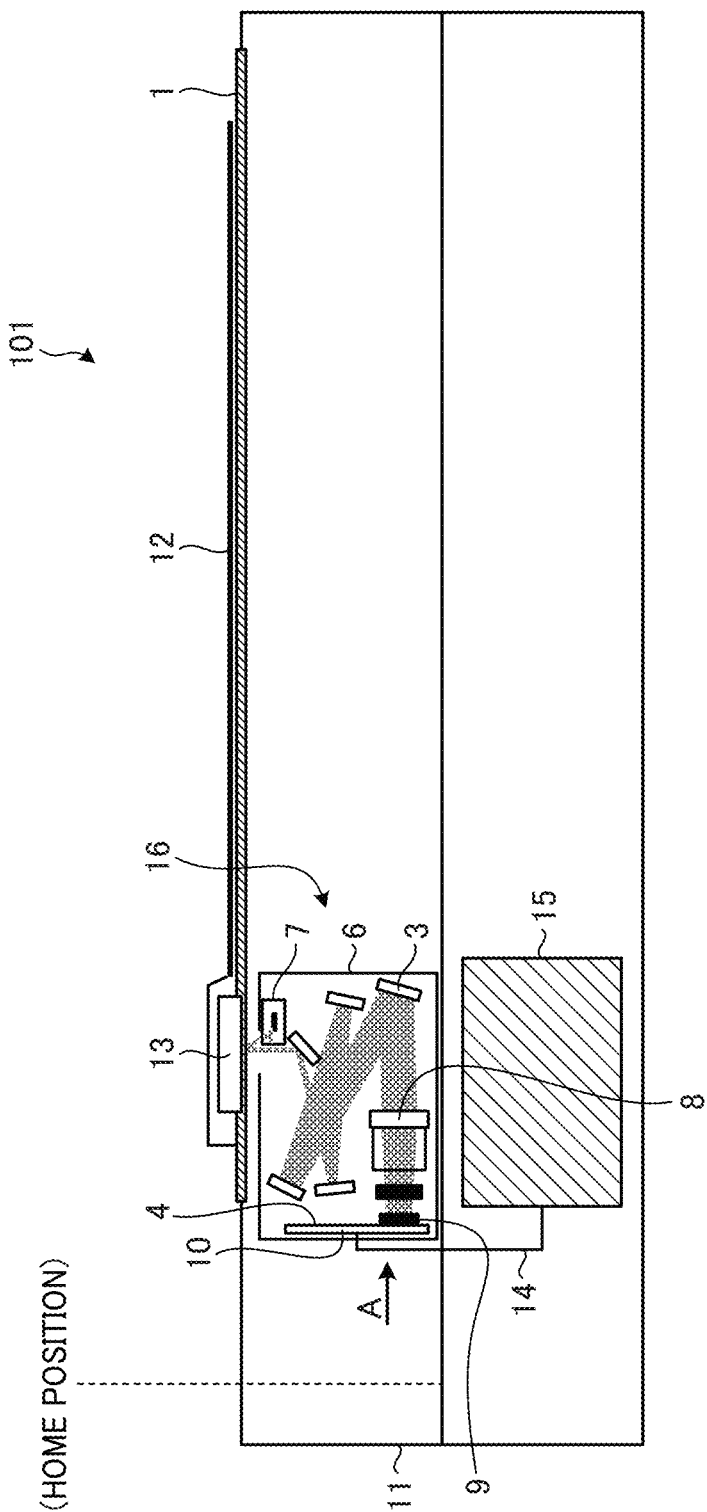
FIG. 2 is a cross-sectional view schematically illustrating structure of an image reading unit.

FIG. 2 is a cross-sectional view schematically illustrating structure of the image reading unit 101. As illustrated in FIG. 2, the image reading unit 101 includes, in a main unit 11, a reading unit 16 and an image processing circuit board 15 (may be referred to as an image processing board 15) which is an example of image processing device. The reading unit 16 includes a carriage (traveling body) 6 and an image reading board 10. The image reading board 10 includes a line-shaped CMOS image sensor 9 and a signal processing unit 4. The image reading board 10 is connected to the image processing board 15 via a cable 14. The cable 14 is a transmission line such as a flexible flat cable (FIT).

The reading unit 16 is an image sensor unit and, for example, a contact image sensor (CIS). In the reading unit 16, in addition to the image reading board 10, a light source 7 which is a light emitting diode (LED), a lens unit 8, a mirror 3, and the like are arranged inside the carriage (traveling body) 6.

Further, the image reading unit 101 includes the contact glass 1 and a density reference member 13 on the upper surface. The density reference member 13 is a reference plate (for example, a white reference plate) having a reference density to be used for adjusting density of image data. The density reference member 13 is, for example, a subject used for performing shading correction for correcting aberrations, illumination unevenness, and the like of the lens in the lens unit 8.

In the reading operation, the image reading unit 101 emits light from the light source 7 upward while moving the carriage (traveling body) 6 from the standby position (home position) in the sub-scanning direction (A direction) along the contact glass 1. Then, the carriage (traveling body) 6 moves to form an image of reflected light from a document 12 on the contact glass 1 on the CMOS image sensor 9 via the lens unit 8, and the image reading unit 101 reads the light line by line.

Further, when the power is turned on, the image reading unit 101 reads the reflected light from the density reference member 13 and sets a reference level of image. That is, the image reading unit 101 moves the carriage (traveling body) 6 directly under the density reference member 13, turns on the light source 7, forms an image of the reflected light from the density reference member 13 on the CMOS image sensor 9, and reads line by line.

The signal processing unit 4 of the image reading board 10 converts analog image data output from the CMOS image sensor 9 to digital output (analog-digital (AD) conversion). The signal processing unit 4 transmits the AD-convened image data (digital) to the image processing board 15. Further, the signal processing unit 4 controls turning on/off of the light source 7.

Although the details are described below, the image processing board 15 has a function of executing, for example, shading correction based on the reflected light from the density reference member 13.

Figure 3:
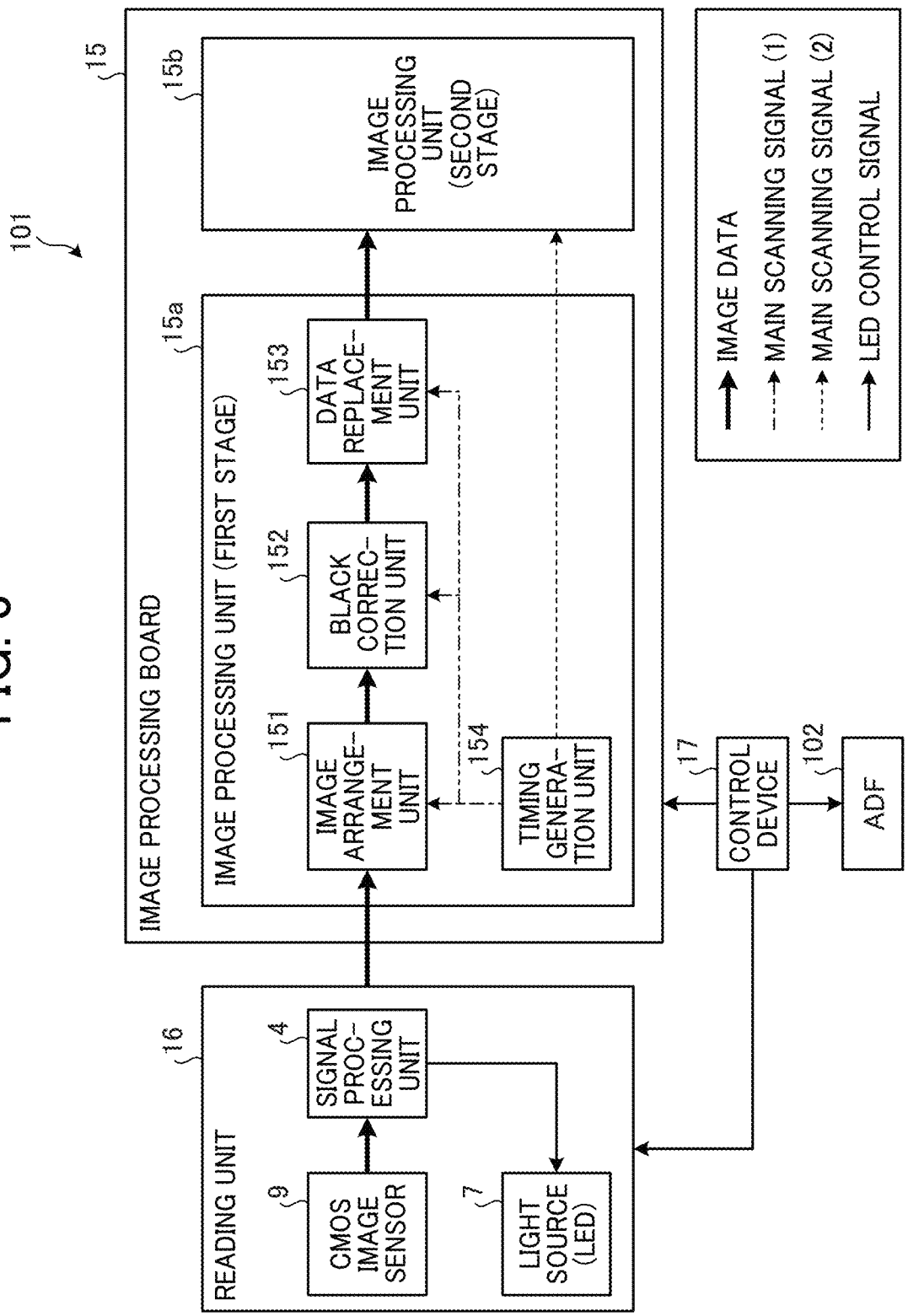
FIG. 3 is a block diagram illustrating an electrical connection of each part included in the image reading unit.

FIG. 3 is a block diagram illustrating an electrical connection of each part included in the image reading unit 101. As illustrated in FIG. 3, the image reading unit 101 includes the reading unit 16, the image processing board 15, and a control device 17. The reading unit 16 includes the light source 7, the CMOS image sensor 9, and the signal processing unit 4. The control device 17 controls each part of the ADF 102, the reading unit 16, and the image processing board 15.

The control device 17 includes a central processing unit (CPU) that controls the whole image reading unit 101, a read only memory (ROM) that stores various data and various programs, a random access memory (RAM), and the like.

The program executed by the control device 17 in the present embodiment is recorded and provided as a file of an installable format or an executable format on a non-transitory computer-readable recording medium such as a compact disc read-only memory (CR-ROM), a flexible disk (FD), a compact disc recordable (CD-R), or a digital versatile disc (DVD).

Further, the program executed by the control device 17 may be stored on a computer connected to a network such as the internee and provided by downloading the program via the network. Further, the program executed by the control device 17 may be configured to be provided or distributed via a network such as the Internet. Further, the program executed by the control device 17 may be configured to be provided by incorporating the program into a ROM or the like in advance.

The image processing board 15 is implemented by an image processing application specific integrated circuit (ASIC). The image processing board 15 is divided into an image processing unit (first stage) 15a and an image processing unit (second stage) 15b.

The image processing unit (first stage) 15a includes an image arrangement unit 151, a black correction unit 152, a data replacement unit 153, and a timing generation unit 154, each of which is implemented by a circuit.

The image processing unit (second stage) 15b performs color conversion, filter image processing, and the like.

The image arrangement unit 151 of the image processing unit (first stage) 15a converts the image data (digital) input from the reading unit 16 to arrange in order from the first pixel in the main scanning direction and outputs to the black correction unit 152.

The black correction unit 152 subtracts (black correction) the output of the CMOS image sensor 9 when no input light is received, from the output of the reading unit 16 and output to the data replacement unit 153. The black correction is a correction for removing the output of the CMOS image sensor 9 generated when the light source 7 of the reading unit 16 is turned off, that is, when no light is incoming (when no input light is received).

The data replacement unit 153 converts and fixes image data of an invalid area (invalid pixel period of the CMOS image sensor 9) other than the main scanning signal (1) input from the timing generation unit 154 described below, to output value of the white side (low density side) corresponding to the margin of the recording paper (predetermined output value (for example, 255 hits with 8-bit gradation)) and outputs to the image processing unit (second stage) 15b.

Figure 4:
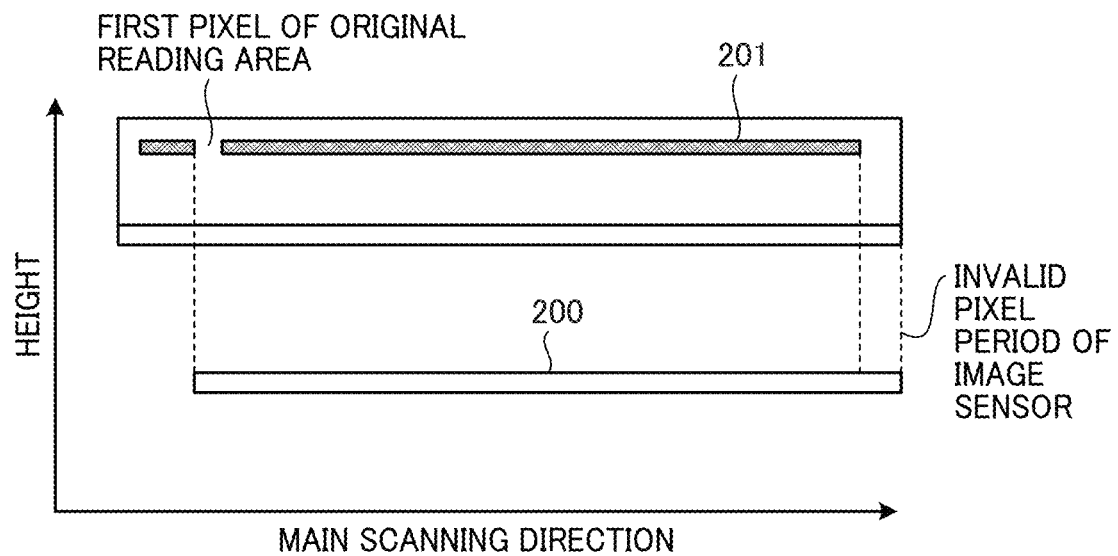
FIG. 4 is a diagram illustrating a configuration which deteriorates image quality in a conventional technique.
Figure 5:
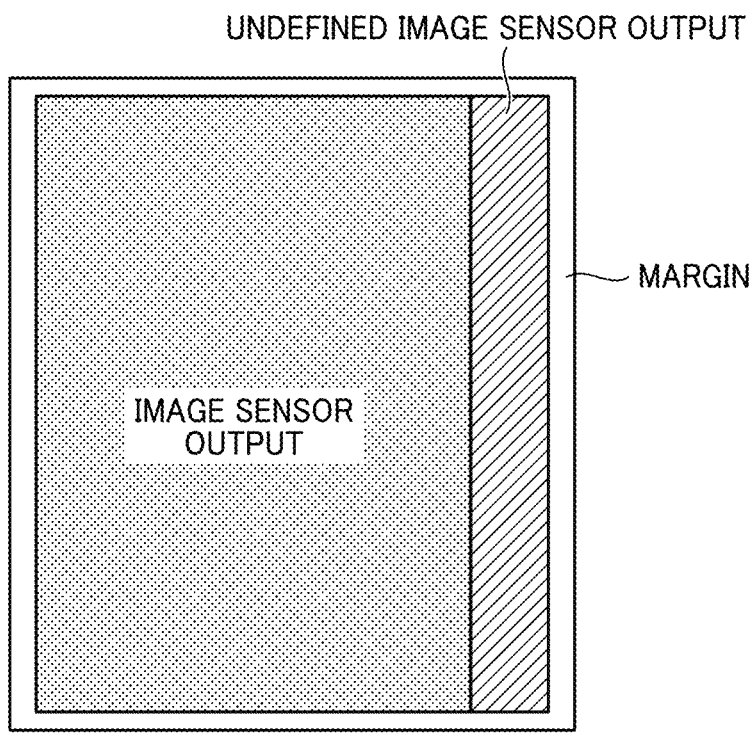
FIG. 5 is a diagram illustrating a print example generated according to the conventional technique.

Reason for converting the image data in the invalid area (invalid pixel period of the CMOS image sensor 9) into the output value on the white side (low density side) (predetermined output value (for example, 255 bits with 8-bit gradation)) is as follows. FIG. 4 is a diagram illustrating a configuration which generates a problem in a conventional technique and FIG. 5 is a diagram illustrating a print example when printed according to the conventional technique. As illustrated in FIG. 4, according to the conventional technique having large accumulation of the component assembly position, an area outside the effective pixel period (invalid pixel period area 201) of the CMOS image sensor 9 may be included at the front end or rear end side of the document 200 when the registration adjustment in the main scanning direction is performed. In FIG. 4, an example is illustrated in which the document 200 is closer to the rear end side of the main scanning with respect to the CMOS image sensor 9, and the rear end of the main scan of the document 200 is approaching the invalid pixel period 201 of the CMOS image sensor 9. In such a case, as illustrated in FIG. 5, since the output value of the data of the invalid pixel period 201 of the CMOS image sensor 9 is undefined, the image of the end portion of the document 200 approaching the invalid pixel period 201 becomes undefined and streaks may occur on the image. In the present embodiment, by providing the data replacement unit 153 that converts the invalid pixel period of the CMOS image sensor 9 to a predetermined output value after the black correction in the black correction unit 152, deterioration of image quality due to image streaks is reduced even if the data of the invalid pixel period of the CMOS image sensor 9 is included when adjusting the registration in the main scanning direction.

Here, the reason for arranging the black correction unit 152 in front of the data replacement unit 153 is described. A general black correction is implemented by the following calculation formula (1).

$$D\text{out (output data)} = D\text{in (input data)} - Bk \text{ (black correction data)} \tag{1}$$

When the image data is corrected by the data replacement unit 153, the black correction unit 152 generates black correction data using the image data after the data replacement. In that case, when applied to the above calculation formula (1), both Din and Bk have the same numerical value in the image data after data replacement, and Dout becomes 0. When Dout becomes 0, the data replacement unit 153 cannot change the color of the image data. Therefore, the black correction unit 152 is arranged in front of the data replacement unit 153.

The timing generation unit 154 generates a main scanning signal (1) indicating the effective pixel period of the CMOS image sensor 9 using the line synchronization signal generated in the timing generation unit 154 as a trigger and inputs to the image arrangement unit 151, the black correction unit 152, and the data replacement unit 153. Further, the timing generation unit 154 generates a main scanning signal (2) indicating the reading area of the document 12 and inputs the main scanning signal (2) to the image processing unit (second stage) 15b to adjust the registration in the main scanning direction. The main scanning signal (1) has a longer period than the main scanning signal (2).

In the following, the main scanning signal (1) and the main scanning signal (2) generated by the timing generation unit 154 are described in detail.

Figure 6:
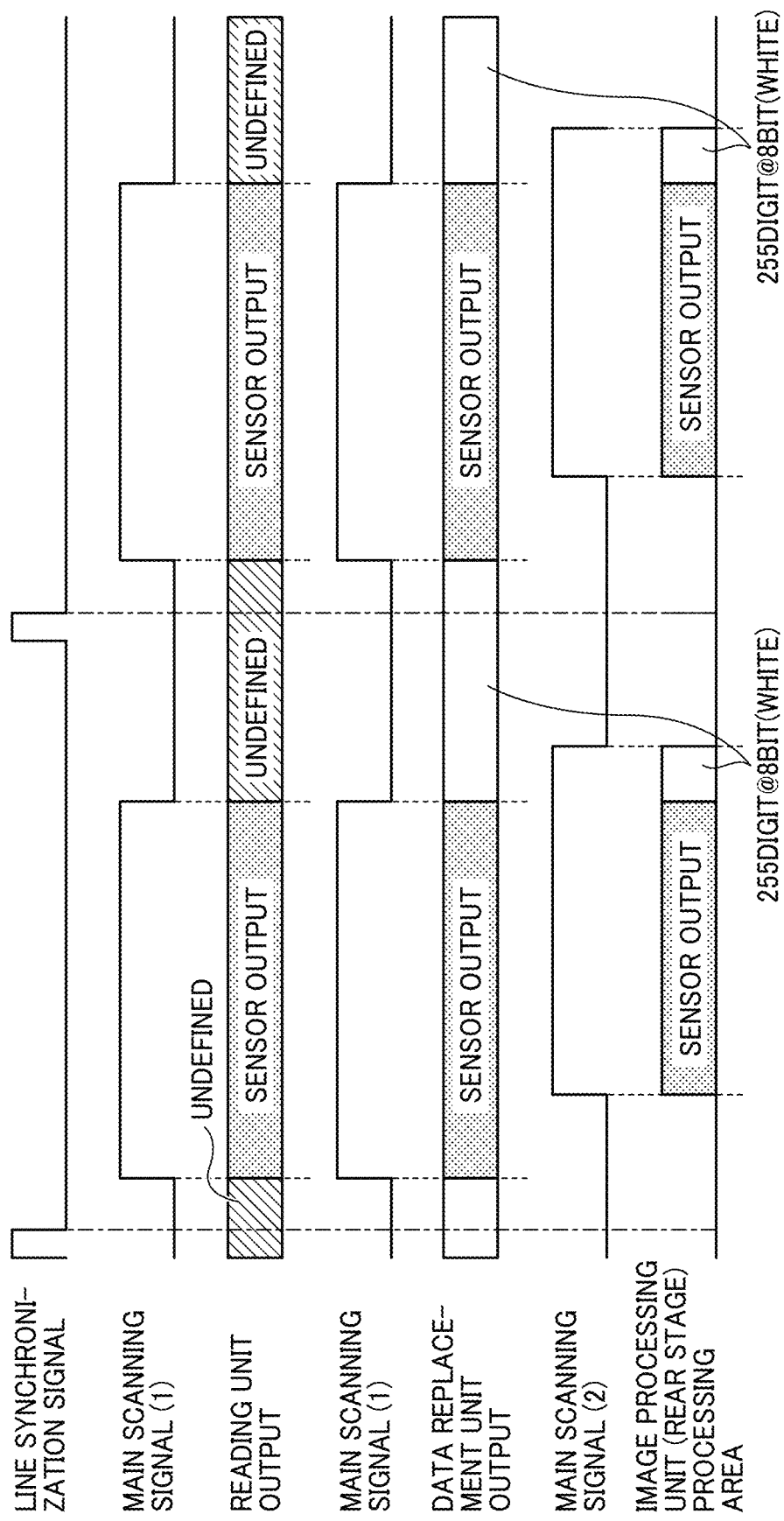
FIG. 6 is a timing chart illustrating output timing of various signals in the image reading unit.

FIG. 6 is a timing chart illustrating output timing of various signals in the image reading unit 101. As illustrated in FIG. 6, the output of the CMOS image sensor 9 from the reading unit 16 is divided into two areas by the main scanning signal (1), the effective pixel period (sensor output) of the CMOS image sensor 9 and the invalid pixel period of the CMOS image sensor 9.

In other words, the timing generation unit 154 serves as a data discrimination unit (that is, a data discrimination circuit) that discriminates between the valid area (valid pixel period of the CMOS image sensor 9) and the invalid area (invalid pixel period of the CMOS image sensor 9) of the image data output from the reading unit 16.

In short, the image processing unit (first stage) 15a that has received the data from the reading unit 16 performs the following process.

1. The timing generation unit 154 generates the line synchronization signal.
2. The timing generation unit 154 generates the main scanning signal (1) indicating the effective pixel period of the CMOS image sensor 9.
3. The data replacement unit 153 sets the output outside the main scanning signal (1) period to 255 bits with 8-bit gradation (fixed on white).
4. The timing generation unit 154 generates a main scanning signal (2) indicating a reading area of the document 12 (for registration adjustment in the main scanning direction).
5. The timing generation unit 154 outputs the area of the main scanning signal (2) to the image processing unit (second stage) 15b.

Next, scanner control in the image reading unit 101 is described.

Figure 7:
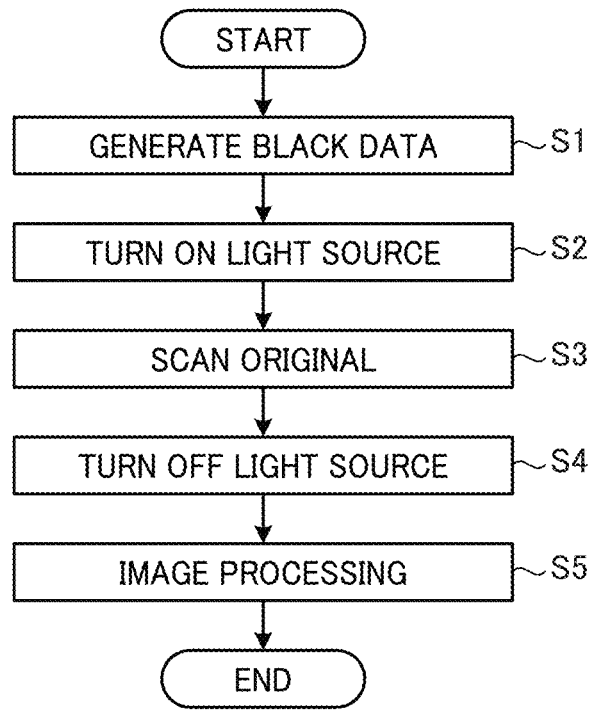
FIG. 7 is a flowchart illustrating a scanner control process in an image reading unit.

FIG. 7 is a flowchart illustrating a scanner control process in the image reading unit 101. As illustrated in FIG. 7, when the start of the reading operation is instructed, the control device 17 controls the reading unit 16 to generate data for black correction, which is the output of the CMOS image sensor 9 when the light source 7 is turned off, that is, when no input light is received, in step S1.

In step S2, the control device 17 controls the reading unit 16 to turn on the light source 7.

In step S3, the control device 17 controls the ADF 102 and the reading unit 16 to pass the document 12 and start the scanning operation.

In step S4, the control device 17 controls the reading unit 16 to turn off the light source 7.

In step S5, the control device 17 controls the image processing unit (first stage) 15a of the image processing board 15 to perform the above-mentioned image processing and ends the reading operation.

Next, a printing example of the image data generated by the above-mentioned image processing in the image forming apparatus 100 is described.

Figure 8:
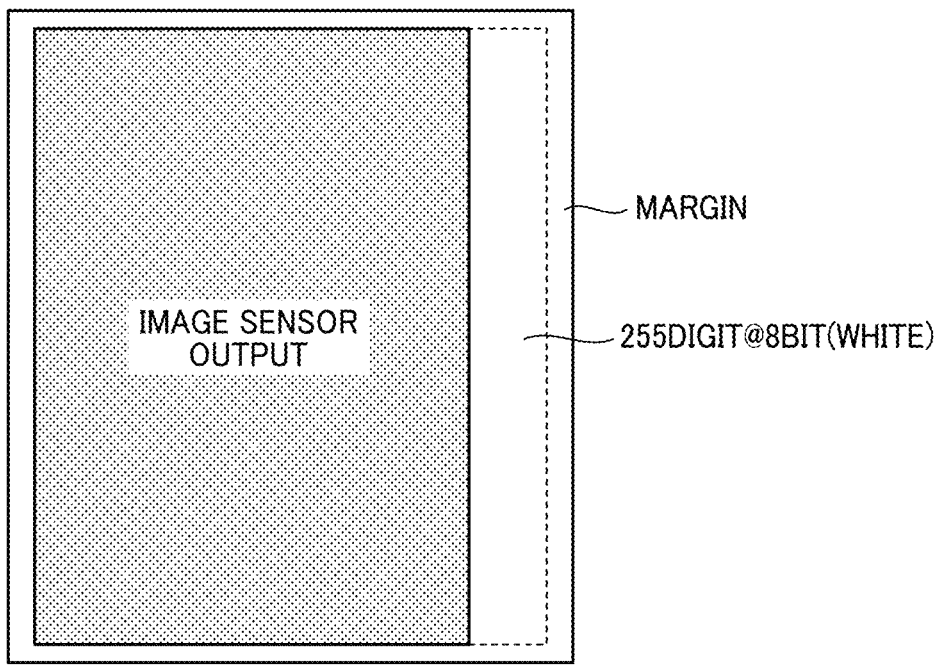
FIG. 8 is a diagram illustrating a print example.

FIG. 8 is a diagram illustrating a print example. The print example illustrated in FIG. 8 includes CMOS image sensor 9 output data which is a document reading result, 255 bits with 8-bit gradation (white) which is an output of an invalid pixel period filled with white, and a margin.

As illustrated in the print example of FIG. 8, as the final image, the margin at the end of the side including the output of the invalid pixel period is extended, but there is no image streak due to indefinite data as illustrated in FIG. 5.

In the present embodiment, since printing is assumed to be performed on a white recording paper, the invalid pixel period is converted to the same output value as the margin portion of the recording paper, but it is not always necessary to fix on white, and may be changed according to the recording paper.

According to the present embodiment, the effect can be maximized by changing the color according to the color of the recording paper used for printing. However, since the majority of the world uses white originals for printing, circuit scale can be reduced by fixing the output of the data replacement unit 153 to white.

Further, when the original data is stored as the scanner reading data instead of printing, the same effect can be obtained by converting the output of the invalid pixel period to the background color of the original data.

According to the present embodiment, deterioration of image quality can be reduced by placing the black correction unit 152 in front of the data replacement unit 153, since the data replacement unit 153 fills the data in the invalid pixel period with white (255 bits with 8-bit gradation), image streaks due to indefinite data disappear in the original data, and the output fixed in white is integrated with the margin.

Further, in the present embodiment, circuit scale of the data replacement unit 153 can be reduced by converting and fixing the image data of the invalid area (invalid pixel period of the CMOS image sensor 9) other than the main scanning signal (1) input from the timing generation unit 154 to the output value on the white side (low density side, for example, 255 bits with 8-bit gradation).

In the present embodiment, the output of the data replacement unit 153 is fixed to white (255 bits with 8-bit gradation), but in the present disclosure, the output of the data replacement unit 153 is not limited to white.

The data replacement unit 153 may detect a background area of the document 12 and convert the output of the invalid area (invalid pixel period of the CMOS image sensor 9) into the background area of the document 12.

The operation of the data replacement unit 153 when converting the output of the invalid area (invalid pixel period of the CMOS image sensor 9) to the background of the document 12 is described below in detail.

Figure 9:
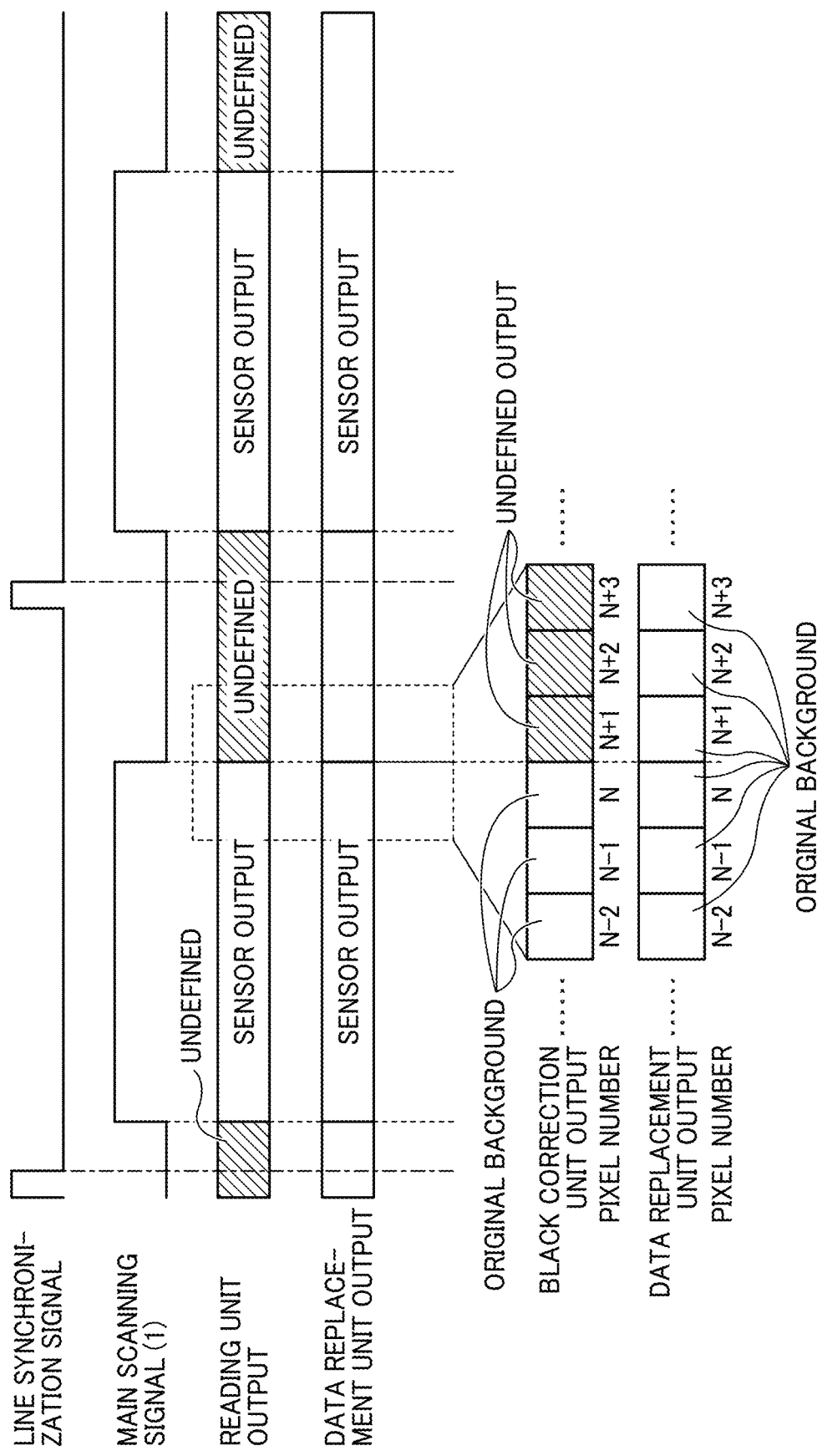
FIG. 9 is a diagram schematically illustrating operation of a data replacement unit when converting output of an invalid area to background.

FIG. 9 is a diagram schematically illustrating operation of the data replacement unit 153 when converting output of the invalid area to background. In FIG. 9, the last pixel of an assert period of the main scanning signal (1) is indicated as N. As illustrated in FIG. 9, at the time of output from the black correction unit 152, the data from the CMOS image sensor 9 is output during the assert period of the main scanning signal (1) and undefined data is output during a negate period of the main scanning signal (1).

As illustrated in FIG. 9, the data replacement unit 153 holds the data of the last pixel N in the assert period of the main scanning signal (1), and outputs the same data during the negate period of the main scanning signal (1). As a result, the output of the invalid area (the invalid pixel period of the CMOS image sensor 9) can be converted into the background of the document 12.

In the present embodiment, the data of the final pixel N is output in undefined period, but the present disclosure is not limited to the data of the final pixel N. For example, the average value of a total of 10 pixels of N–9 to N may be output in the undefined period.

As described above, according to a modified example of the present embodiment, for example, the margin at the edge of the document 12 is generally the original background output, and by matching the output value of the undefined data to the background of the original, it is possible to reduce image streaks due to undefined periods.

Hereinafter, a description is given of a second embodiment.

The second embodiment is different from the first embodiment in that white correction is performed. In the second embodiment, the elements, functions, processes, and steps that are the same or substantially the same as those described in the first embodiment are denoted by the same reference numerals or step numbers, and redundant descriptions thereof are omitted below. The description is given of the differences from the first embodiment.

Figure 10:
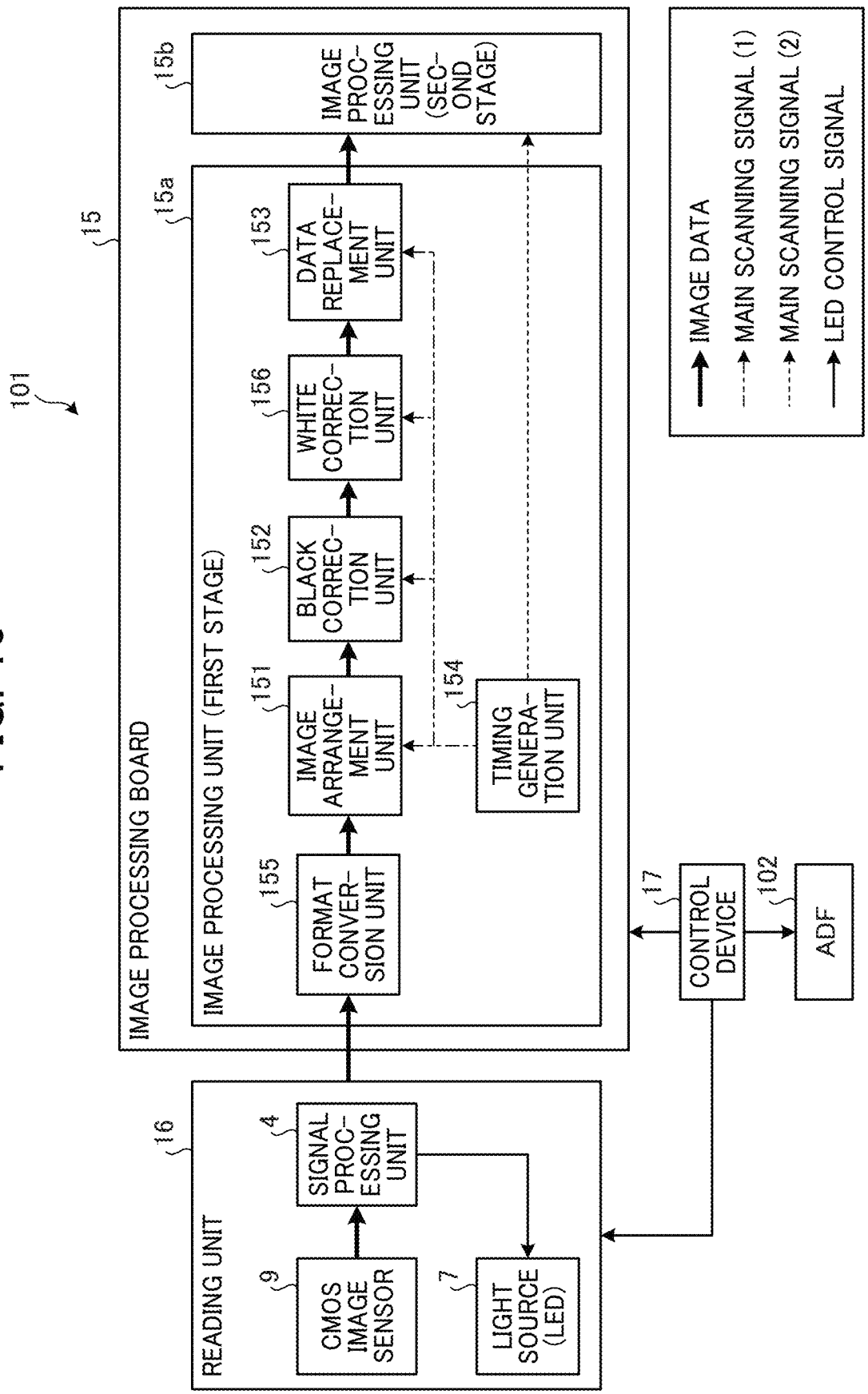
FIG. 10 is a block diagram illustrating an electrical connection of each part included in the image reading unit according to a second embodiment.

FIG. 10 is a block diagram illustrating an electrical connection of each part included in the image reading unit 101 according to the second embodiment. As illustrated in FIG. 10, the image processing unit (first stage) 15a includes the image arrangement unit 151, the black correction unit 152, the data replacement unit 153, and the timing generation unit 154 described in the first embodiment. In addition to these units, a format conversion unit 155 and a white correction unit 156 are provided, each of which is implemented by a circuit.

The format conversion unit 155 of the image processing unit (first stage) 15a converts the format of the image data (digital) input from the reading unit 16 and outputs the converted image data to the image arrangement unit 151.

The image arrangement unit 151 converts the image data (digital) input from the format conversion unit 155 to arrange in order from the first pixel in the main scanning direction and outputs to the black correction unit 152.

The black correction unit 152 subtracts (black correction) the output data of the CMOS image sensor 9 when no input light is received, and outputs the data to the white correction unit 156.

The white correction unit 156 corrects the output data from the black correction unit 152 by using the result of reading the density reference member 13, and outputs the corrected data to the data replacement unit 153.

The data replacement unit 153 outputs and fixes the data in the invalid area (invalid pixel period of the CMOS image sensor 9) other than the main scanning signal (1) input from the timing generation unit 154, which is described below, to the white side (low density side) output value (a predetermined output value), and outputs to the image processing unit (second stage).

Here, the reason for arranging the white correction unit 156 in front of the data replacement unit 153 is described. A general white correction is implemented by the following calculation formula (2).

$$D\text{out (output data)} = D\text{in (input data)}/SD\text{(white correction data)} \times GB \text{ (gray balance coefficient)} \quad (2)$$

GB is a coefficient for reducing variation in red, green and blue (RGB) colors when reading gray.

When the image data is corrected by the data replacement unit 153, the white correction unit 156 generates white correction data using the image data after the data replacement. In that case, when applied to the above calculation formula (2), both Din and SD have the same numerical value in the image data after data replacement, and Dout becomes GB. When the Dout becomes GB, the data replacement unit 153 cannot change to a color, so the white correction unit 156 is arranged in front of the data replacement unit 153.

However, unlike the black correction, the GB value itself is generally stable on the high density side as a value. For example, since the S-bit gradation is about 250 bits, the effect is small when the data replacement unit 153 wants to bring the numerical value to the white side.

The timing generation unit 154 generates a main scanning signal (1) indicating the effective pixel period of the CMOS image sensor 9 using the line synchronization signal generated in the timing generation unit 154 as a trigger and inputs to the image arrangement unit 151, the black correction unit 152, the data replacement unit 153, and the white correction unit 156. Further, the timing generation unit 154 generates a main scanning signal (2) indicating the reading area of the document 12 and inputs the main scanning signal (2) to the image processing unit (second stage) 15b to adjust the registration in the main scanning direction. The main scanning signal (1) has a longer period than the main scanning signal (2).

Next, scanner control in the image reading unit 101 is described.

Figure 11:
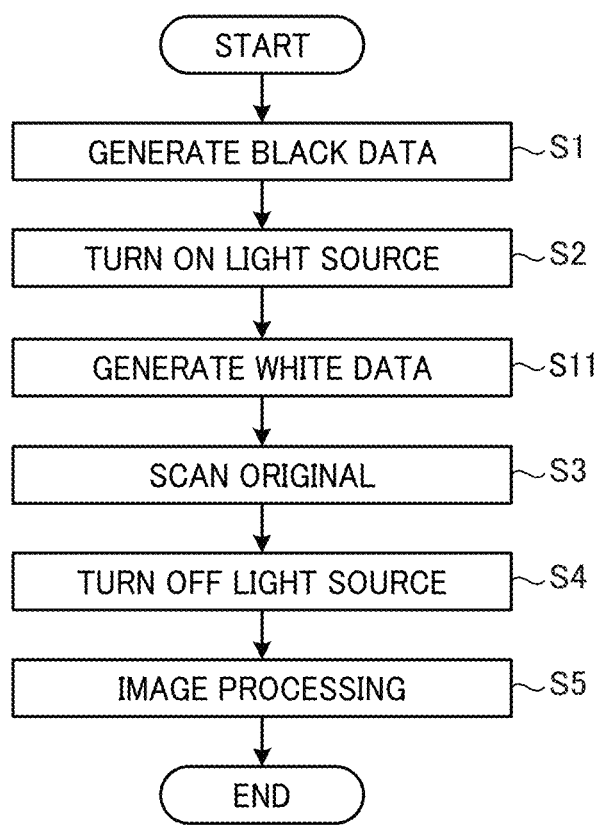
FIG. 11 is a flowchart illustrating the scanner control process in the image reading unit.

FIG. 11 is a flowchart illustrating a scanner control process in the image reading unit 101. As illustrated in FIG. 11, when the start of the reading operation is declared, the control device 17 controls the reading unit 16 to generate data for black correction, which is the output of the CMOS image sensor 9 when the light source 7 is turned off, that is, when no input light is received, in step S1.

In step S2, the control device 17 controls the reading unit 16 to turn on the light source 7.

In step S11, the control device 17 controls the reading unit 16 to move the carriage (traveling body) 6 directly under the density reference member 13, images the reflected light from the density reference member 13 on the CMOS image sensor 9 and generate data for white correction.

In step S3, the control device 17 controls the ADF 102 and the reading unit 16 to pass the document 12 and start the scanning operation.

In step S4, the control device 17 controls the reading unit 16 to turn off the light source 7.

In step S5, the control device 17 controls the image processing unit (first stage) 15a of the image processing board 15 to perform the above-mentioned image processing and ends the reading operation.

As described above, according to the present embodiment, a change in the output value during the invalid pixel period filled with white by performing white correction is prevented.

In the above embodiments, an example in which the image forming apparatus of the present disclosure is an MFP including at least two of a copy function, a printer function, a scanner function, and a facsimile function is described, but the embodiments may be applied to any image forming apparatus such as a printer, a scanner, and a facsimile.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

What is claimed is:

1. An image processing circuit board comprising:
a black correction circuit configured to subtract output of an image sensor when no input light is received from output of a reading device, the reading device being configured to read image data of a subject using the image sensor;
a data discrimination circuit configured to discriminate between effective area and invalid area of the image data output by the reading device; and
a data replacement circuit configured to convert the image data of the invalid area into a predetermined output value after the output of the image sensor when no input light is received is subtracted from the output of the reading device.

2. The image processing circuit board of claim 1, wherein the data replacement circuit is configured to
convert the output value of the image data into the output value on a low density side.

3. The image processing circuit board of claim 1, further comprising:
a white correction circuit configured to correct the image data using result of reading a density reference member after the output of the image sensor when no input light is received is subtracted, and output the image data for conversion of the image data of the invalid area.

4. The image processing circuit board of claim 1, wherein the data replacement circuit is configured to
detect background area of a document and convert the image data of the invalid area into output value of the background area of the document.

5. A reading device comprising:
an image sensor unit that generates image data of a subject; and
the image processing circuit board of claim 1.

6. An image forming apparatus comprising:
the reading device of claim 5; and
an image forming device.

7. An image processing method executed by an image processing circuit board, the image processing method comprising:
- subtracting output of an image sensor when no input light is received from output of a reading device, the reading device being configured to read image data of a subject using the image sensor;
- discriminating between effective area and invalid area of the image data output by the reading device; and
- converting the image data of the invalid area into a predetermined output value after the output of the image sensor when no input light is received is subtracted from the output of the reading device.

8. An image processing device comprising:
- a black correction unit configured to subtract output of an image sensor when no input light is received from output of a reading device, the reading device being configured to read image data of a subject using the image sensor;
- a data discrimination unit configured to discriminate between effective area and invalid area of the image data output by the reading device; and
- a data replacement unit configured to convert the image data of the invalid area into a predetermined output value after the output of the image sensor when no input light is received is subtracted from the output of the reading device.

* * * * *